Patented July 21, 1942

2,290,794

UNITED STATES PATENT OFFICE 2,290,794

AQUEOUS DISPERSIONS OF ETHYLENE POLYMERS

Alfonso M. Alvarado, Wilmington, and George L. Dorough, Holly Oak, Del., assignors to E. I. du Pont de Nemours & Company, Wilmington, Del., a corporation of Delaware No Drawing. Application March 22, 1939, Serial No. 263,552. In Great Britain September 8, 1938

6 Claims. (Cl. 260—32)

This invention relates to the art of dispersions, and more particularly to new aqueous dispersions of polymeric material useful in the coating and impregnating arts.

The polymers from which the aqueous dispersions of this invention are made are the ethylene polymers obtained by the process described in application Serial Number 123,722, filed February 2, 1937, by Fawcett, Gibson and Perrin, and in application Serial Number 157,810, filed August 6, 1937, by Perrin, Paton and Williams. The process described in the first mentioned application consists in subjecting ethylene to pressures in excess of 500 atmospheres under controlled elevated temperature conditions. This procedure results in various polymers of ethylene, the molecular weight of which varies depending particularly upon the pressure and temperature conditions employed. By using pressures of more than 1000 atmospheres and temperatures of the order of about 200° C., solid polymers of ethylene can be formed. Under these conditions the polymerization reaction takes place smoothly, requiring several hours for completion. Or the more rapid reaction described in the second mentioned application may be used. In this method a definite but small quantity of oxygen, which may be as little as 0.01% but preferably 0.03% to 0.10% at 1500 atmospheres, is included in the ethylene treated. The pressures are at least 500 atmospheres and preferably at least 1000 atmospheres and below 3000 atmospheres. The temperatures are between 100° C. and 400° C. and more desirably from 150° C. to 250° C. Thus, as a specific instance of obtaining the ethylene polymer, ethylene containing 0.05% oxygen is compressed in a steel bomb to a total pressure of 1500 atmospheres and heated rapidly to 210° C., whereupon a very sudden rise in pressure followed by a slow drop in pressure is observed. After five hours' heating at 210° C. the pressure is released and the produce cooled. Under these conditions an 80% yield of the solid polymer, based on the ethylene used, is obtained. These solid ethylene polymers obtained as outlined above melt or soften above about 100° C., usually between 110° C. and 200° C. depending upon the molecular weight of the particular polymer, have high molecular weights ranging from 2000 upwards to 24,000 or even higher, e. g., 30,000 or 40,000, and are essentially saturated products corresponding in composition substantially to $(CH_2)_x$. They are soluble in xylene at its boiling point and are unaffected by prolonged contact with air at ordinary temperature. These solid polymers as ordinarily prepared show a crystalline structure when subjected to X-ray diffraction analysis.

The molecular weights mentioned herein were obtained by the method for determining the molecular weights of polymers of high molecular weight devised by H. Staudinger (see Berichte der deutschen chemischen Ges. 1934, 67B, 1247 et seq.), this method being based upon the measurement of the viscosity of a solution of the polymer in a solvent (tetrahydronaphthalene). As this method may not be susceptible of a high degree of accuracy, the values given in this specification should be in all cases regarded as approximate.

The melting or softening points of the polymers were measured by a "ball and ring" method in which a film of polymer, supported over a ring, is heated by immersion in a heated non-solvent and a small steel ball is placed over the film. The melting or softening point is taken to be the temperature at which the polymer is so sufficiently soft that the ball passes through the ring. In this connection it is to be noted that the polymer does not melt sharply but changes slowly from a solid to a more or less viscous liquid.

The above polymers are valuable coating materials but the difficulties encountered in their application to this field have been found to be a serious drawback. The use of solutions of the polymer in organic solvents is not economically satisfactory because the polymer is substantially insoluble in organic solvents below 50° C. Application from the molten polymer is unsatisfactory because even the lowest melting of the solid polymers requires a temperature of at least 100° C.

This invention has as its object the preparation of aqueous dispersions of the solid ethylene polymers referred to above. A further object is the preparation of aqueous dispersions of the ethylene polymers without the use of organic solvents. A still further object is the use of these aqueous dispersions in the coating and impregnating arts. Other objects will appear hereinafter.

These objects are accomplished by a process, more particularly described hereinafter, which comprises mechanically working a dispersing agent and a protective colloid into the polymer and then reducing the paste thus formed with water to the desired solids content.

In the preferred embodiment of this invention the dispersing agent, as for instance a salt of a fatty acid either added as such or formed in situ during the dispersion, and a protective colloid, such as triethanolamine, are mechanically worked into an ethylene polymer of molecular weight at least 4000 in a device capable of doing internal work on the mixture. Such a device is a rotary type Banbury mill, the block and rotors of which can be heated with steam. When the ethylene polymer is milled in such a device at a temperature a few degrees below its melting point, it becomes plastic. This plastic state is best suited for the incorporation of the other ingredients of the dispersion although this requirement is not critical. For instance, at a temperature somewhat below that sufficient to render the polymer plastic, incorporation may be carried out by longer milling; and on the other hand the polymer may be melted by heating above the plastic stage and incorporation carried out, if due precautions are taken to prevent vapor loss of the ingredients being added.

As an instance of this method of carrying out the invention, the polymer is heated and milled at 95° C. until uniformly plastic. During continued heating and milling a mixture of the triethanolamine or other protective colloid, and a long chain fatty acid (for example oleic acid) is added portionwise over a period of about 40 minutes and thoroughly incorporated into the plastic mass. Then a solution of a hydroxide of an alkali metal is added portionwise over a period of about 80 minutes in about 10% excess of that required to react with the fatty acid present. While milling is continued, the heat is cut off; and as the plastic mass begins to cool, water is added at intervals in small amounts. Within about an hour the mixture cools sufficiently to solidify. The presence of the water in the mass as well as the constant kneading of the milling operation causes the mass to "break" at its solidification point into particles that are colloidal in size and are readily dispersed by adding more water to form a paste, dumping from the mill and stirring in further quantities of water until the desired solids content is obtained.

The following examples are further illustrative of the practice of our invention:

Example I

|  | Grams |
|---|---|
| Ethylene polymer (molecular weight 10,000 to 20,000) | 220 |
| Oleic acid | 20 |
| Triethanolamine | 10 |
| Potassium hydroxide solution (5% KOH in H$_2$O) | 84 |
| Water | 400 |
| Total | 734 |

The ethylene polymer is placed in a Banbury mill with steam passing through the block and rotors to keep the contents of the mill at 95° C. and milled for 20 minutes until thoroughly plastic and resembling very stiff taffy. Then the oleic acid is added in 4 gram portions alternated with 2 gram portion additions of triethanolamine. These additions are made over a period of 20 minutes, after which the mass is milled for another 30 minutes to insure thorough incorporation. Then the potassium hydroxide is added in 12 gram portions over a period of 40 minutes. At the end of this time the steam heat is cut off and the milling continued as the mill and contents slowly cool. During the first hour of this slow cooling process 100 grams of water are added in small portions. At the end of this treatment the mass in the mill has cooled sufficiently to "break" to a fine cheese-like paste. This is milled for another 30 minutes during which time another 100 grams of water are added. At this point further cooling to room temperature is accomplished by passing cold water through the block and rotors of the mill. The slurry is dumped from the mill and reduced slowly by stirring in the remaining 200 grams of water. The product contains about 30% of the ethylene polymer in dispersed form and shows but slight tendency to settle out on standing. A sheet of unsized paper dipped into the above dispersion, drained, heated at 120° C. for 15 minutes and quenched quickly in cold water is impregnated and coated with a smooth film of the polymer which renders it highly water-repellent, flexible and crease-resistant. Strips of bleached cotton muslin and of silk cloth were treated as indicated above in connection with paper. The treated products obtained were highly water-repellent, semi-transparent, and flexible. Examination of the products showed thorough impregnation with polymer.

Example II

|  | Grams |
|---|---|
| Ethylene polymer (molecular weight 20,000 to 30,000) | 220 |
| Petroleum sulfonic acid | 10 |
| Triethanolamine | 2 |
| Potassium hydroxide solution (5% KOH in H$_2$O) | 84 |
| Water | 418 |
| Total | 734 |

The ethylene polymer is cut up into pieces of largest average diameter ¼ inch and this granular material is mixed with the petroleum sulfonic acid and triethanolamine. The mixture is then placed in the Banbury mill at 95° C. and milled for 30 minutes until plastic and thoroughly homogeneous. The heat is then shut off and the potassium hydroxide solution added in 12 gram portions during the next 40 minutes. Then two 9 gram portions of water are added at 10 minute intervals. At the end of this time the mass "breaks" to a cheesy paste. Milling is continued for 30 minutes during which time 100 grams of water are added. The slurry is dumped from the mill and reduced by slowly stirring in the remaining 300 grams of water. The product contains about 30% ethylene polymer and may vary from a light cream color to pure white depending on the purity of the petroleum sulfonic acid used in forming the dispersing agent. Wood to wood seals made by painting the surfaces with this dispersion and heating at 135° C. while pressed together for 12 hours have a tensile strength above 550 lbs. per sq. in. Thread coated from this dispersion, dried, woven over copper wire, heated momentarily at 120° C. and plunged into cold water provides a smooth, durable sheath of excellent electrical insulating capacity.

Although in the examples noted above, the ethylene polymer used ranged in molecular weight from 10,000 to 30,000, it is to be understood that this invention may be used in the dispersion of all samples of ethylene polymer of molecular weight above about 4,000.

Materials to be incorporated with ethylene polymer as dispersing agents are not limited to salts of fatty acids preformed or formed in situ during the process of dispersion but may also comprise other of the known dispersing agents such as salts of ammonia or organic amines with higher fatty acid such as those which occur in animal fat, China-wood oil, castor oil, soya bean oil, etc. These soaps or salts may be used directly as such or may be formed from their constituents during the preparation of the dispersion.

As a protective agent triethanolamine may be used as in the examples above or any of the substances commonly known to possess the properties of protective colloids, for instance, casein, glue, gelatin, gum arabic, and the like.

In addition various fillers and modifying agents may be incorporated in the dispersion during the milling operation. These may include paraffin wax, natural waxes such as bees wax, Chinese insect wax, carnauba wax, montan wax, candelilla wax and the like, synthetic waxes, rosin, natural and synthetic resins and gums, cellulose and its derivatives, pigments, dyes, talc and other finely divided minerals, various organic materials such as fats, oils, and solvents, finely divided metal and other similar materials which are useful for modifying dispersions for various uses.

The invention is not limited to the procedures illustrated in the examples above. For instance, the incorporation of the protective colloid and higher fatty acid with ethylene polymer may be accomplished by mixing in a molten state at temperatures above 110° C., or by dissolving all three in a hot hydrocarbon solvent such as xylene. After the materials have been thoroughly dissolved and mixed, the solvent may be evaporated, the resulting homogeneous mass placed in a hot mill, rendered plastic, and sodium hydroxide solution and water added as described above. Or instead of employing a fatty acid and a base separately, a finished soap (such as potassium oleate or other dispersing agent) may be used and incorporated with the protective colloid and ethylene polymer by either of the procedures, namely, by direct milling or by first combining by means of some other medium such as a solvent.

In the preparation of dispersions according to the invention by milling in a Banbury mill or similar device the temperature used for incorporating the dispersing agent with the modifying agent, if any, may be varied between wide limits, preferably between 70° C. and 150° C., although temperatures above 100° C. are not suitable to use during the later incorporation of water or aqueous solutions unless the entire mass is maintained under pressure sufficient to maintain the water in the liquid state.

The amount of dispersing agent employed may be varied up to 20% of the weight of the ethylene polymer and the amount of protective colloid may be varied up to 10% of the weight of the ethylene polymer.

The fineness of the particles in the finished dispersion is controlled by the state of the mixture at the solidification point. In general, finer particle size is obtained by incorporating a maximum amount of water into the plastic mass before the "break" occurs. Should cooling take place too rapidly and the mass "break" before sufficient water has been incorporated so that the resulting particle size in the paste is too large to give a stable dispersion, the mass may be remilled and heated, driving off at least part of the water and rendering the mass again plastic. Then the cooling and addition of water may be repeated and the mass caused to "break" again. This process may be repeated any number of times if necessary until the proper amount of water and correct resultant degree of fineness are obtained.

At the end of the milling process the amount of water used to reduced the paste may be varied within wide limits, and dispersions with up to 80% solids as well as highly reduced dispersions with solids content down to a fraction of 1% are prepared with equal ease. The dispersions of high solids content are unusually stable to settling out.

Dispersions of ethylene polymer prepared according to this invention are useful in the treatment of solid or flexible base materials. Thus, articles of metal, wood, leather, paper, regenerated cellulose and its derivatives, glass, glass fabrics, rayon, wool, cotton, natural and synthetic resins, and gums, and the like may be suitably treated in this manner. If a continuous coating is desired, the coated articles are heated to a temperature of 110° C. or above to fuse the ethylene polymer and cause the formation of a continuous coating.

These dispersions are also useful in applying the ethylene polymer in finely divided form; for example, a dilute dispersion of this sort may be incorporated with paper pulp, previous to the matting operation, thus depositing the ethylene polymer uniformly throughout the pulp. If the finished paper from such a procedure is calendered at 100° C. or above, the paper is thoroughly impregnated with the ethylene polymer.

The dispersions obtained by the practice of this invention are also useful in preparing the ethylene polymer in powdered form. The water from the dispersion is evaporated leaving behind an easily pulverizable mass of the ethylene polymer together with whatever solids were used in the preparation of the dispersion. These powders are useful forms in which to carry out such operations as the preparation of pigments containing the ethylene polymer and the milling of the polymer into rubber and similar materials. These powders also represent the most economical form in which to transport the base material for preparation of the dispersions, since the powders are easily redispersed by careful stirring up with water.

This invention makes possible the application of the ethylene polymer in the coating and impregnating art in a more desirable form and at a much more convenient range of temperature, namely, below 50° C., than was heretofore possible. The disadvantages previously referred to of melt application are avoided, and as compared to application as solutions in organic solvent this invention is particularly advantageous in that it avoids the fire hazard which is accentuated by the requirement of elevated temperature for solubility, and in that it avoids the necessity for the protective and recovery equipment used in applications involving organic solvents.

As many apparently widely different embodiments of this invention may be made without departing from the spirit and scope thereof, it is to be understood that we do not limit ourselves to the specific embodiments thereof except as defined in the appended claims.

We claim:

1. A process for preparing an aqueous dispersion of a solid ethylene polymer corresponding in composition substantially to $(CH_2)_x$, and showing by X-ray diffraction analysis a crystalline structure, said process comprising mechanically working said polymer at elevated temperature with a dispersing agent and a protective colloid until the mass becomes plastic, continuing said working in the presence of water during cooling of the mass until it solidifies and crumbles to a paste, and then reducing the paste thus formed with water.

2. A composition of matter comprising an aqueous dispersion of solid ethylene polymer, a dispersing agent and a protective colloid, said polymer corresponding in composition substantially to $(CH_2)_x$ and showing by X-ray diffraction analysis a crystalline structure.

3. A process for preparing an aqueous dispersion of a solid ethylene polymer corresponding in composition substantially to $(CH_2)_x$ and showing by X-ray diffraction analysis a crystalline structure, said process comprising mechanically working a dispensing agent and a protective colloid into said polymer, and then reducing the paste thus formed with water.

4. An aqueous dispersion of a polymer of ethylene which is solid at normal temperature and corresponds in composition substantially to $(CH_2)_x$.

5. An aqueous dispersion of a polymer of ethylene which is solid at normal temperature and corresponds in composition substantially to $(CH_2)_x$ and showing by X-ray diffraction analysis a crystalline structure.

6. A process for preparing an aqueous dispersion of a solid ethylene polymer which comprises mechanically working a dispersing agent into an ethylene polymer corresponding in composition to $(CH_2)_x$ and showing by X-ray diffraction analysis a crystalline structure, and then reducing with water the paste thus formed.

ALFONSO M. ALVARADO.
GEORGE L. DOROUGH.